United States Patent [19]
Watari

[11] 4,146,263
[45] Mar. 27, 1979

[54] VEHICLE BODY STRUCTURE HAVING A WINDSHIELD AND COWL PANEL ASSEMBLY

[75] Inventor: Tadayoshi Watari, Hiroshima, Japan

[73] Assignee: Toyo Kogyo Co., Ltd., Hiroshima, Japan

[21] Appl. No.: 806,333

[22] Filed: Jun. 14, 1977

[30] Foreign Application Priority Data

Jun. 18, 1976 [JP] Japan .............................. 51-81003[U]
Jun. 18, 1976 [JP] Japan .............................. 51-81004[U]
Oct. 18, 1976 [JP] Japan .......................... 51-140258[U]

[51] Int. Cl.² ............................................. B60J 1/00
[52] U.S. Cl. .................................... 296/84 R; 296/187
[58] Field of Search .............. 296/84 R, 84 G, 84 D, 296/28 G

[56] References Cited

U.S. PATENT DOCUMENTS 2,497,261  2/1950  Hicks ................................ 296/84 R
3,843,194  10/1974  Yamada .............................. 296/84 R

FOREIGN PATENT DOCUMENTS 732875  6/1955  United Kingdom .................. 296/28 G

*Primary Examiner*—Philip Goodman
*Attorney, Agent, or Firm*—Fleit & Jacobson

[57] ABSTRACT

Vehicle body structure having a cowl panel assembly extending transversely between a pair of transversely spaced front pillars, said cowl panel assembly having a windshield glass support portion to which a windshield glass is adhesively attached. The glass support portion is formed with a planar rearward extension, and a dashboard having a planar rearwardly extending upper flange is welded at the flange to the rearward extension of the cowl panel assembly. An instrument panel is connected at its front end with the rearward extension of the cowl panel or the upper flange of the dashboard panel.

12 Claims, 12 Drawing Figures

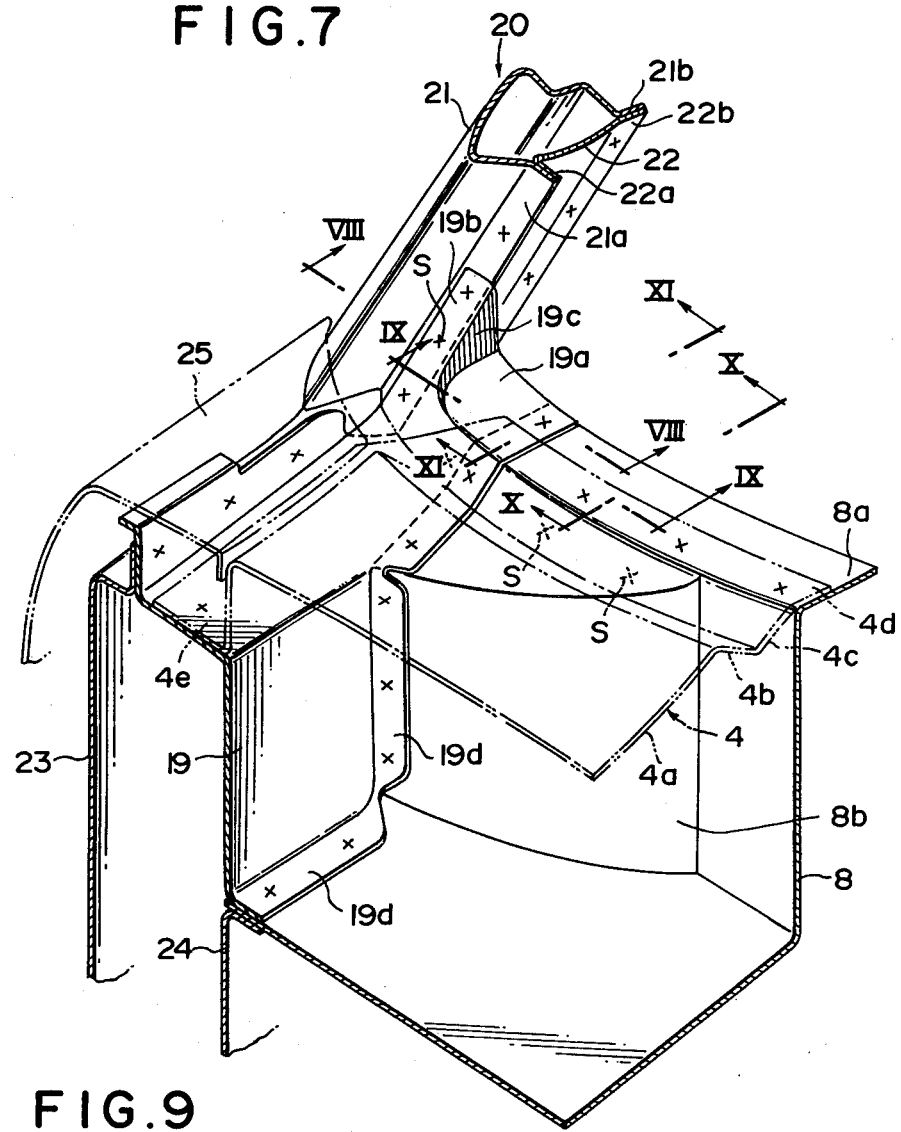
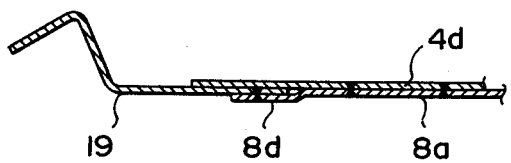
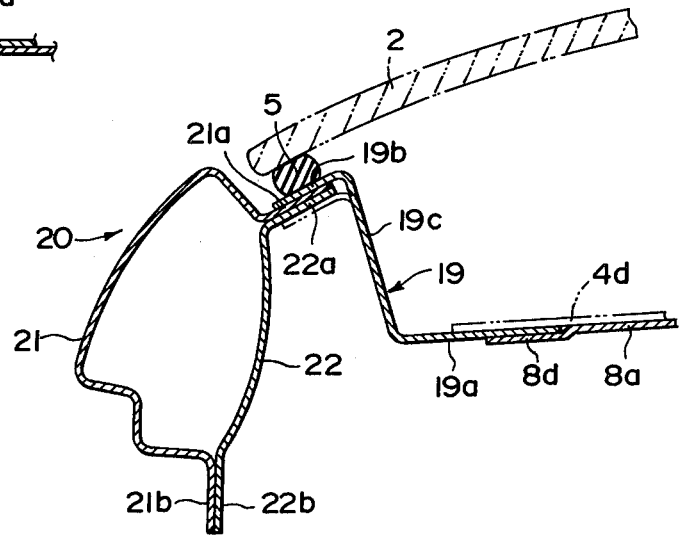

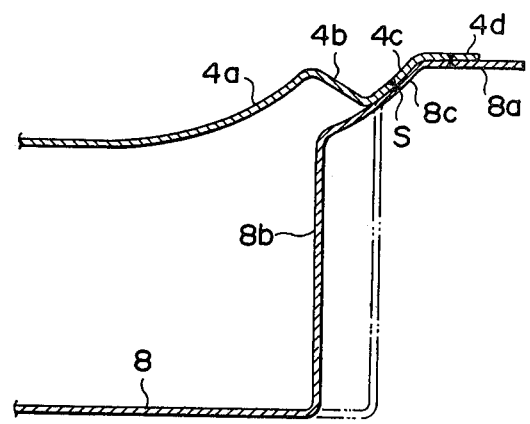
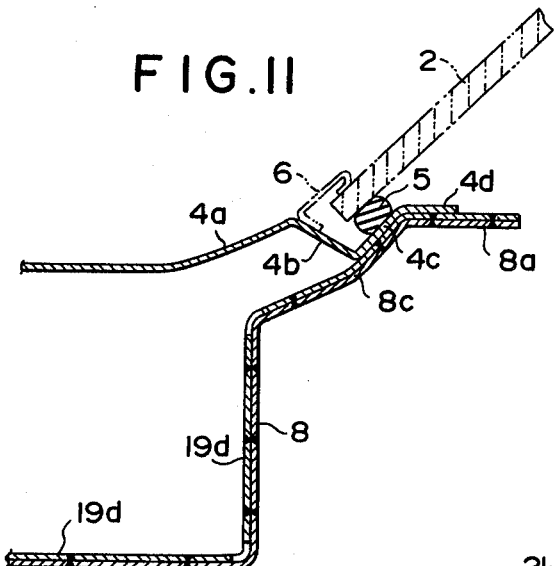
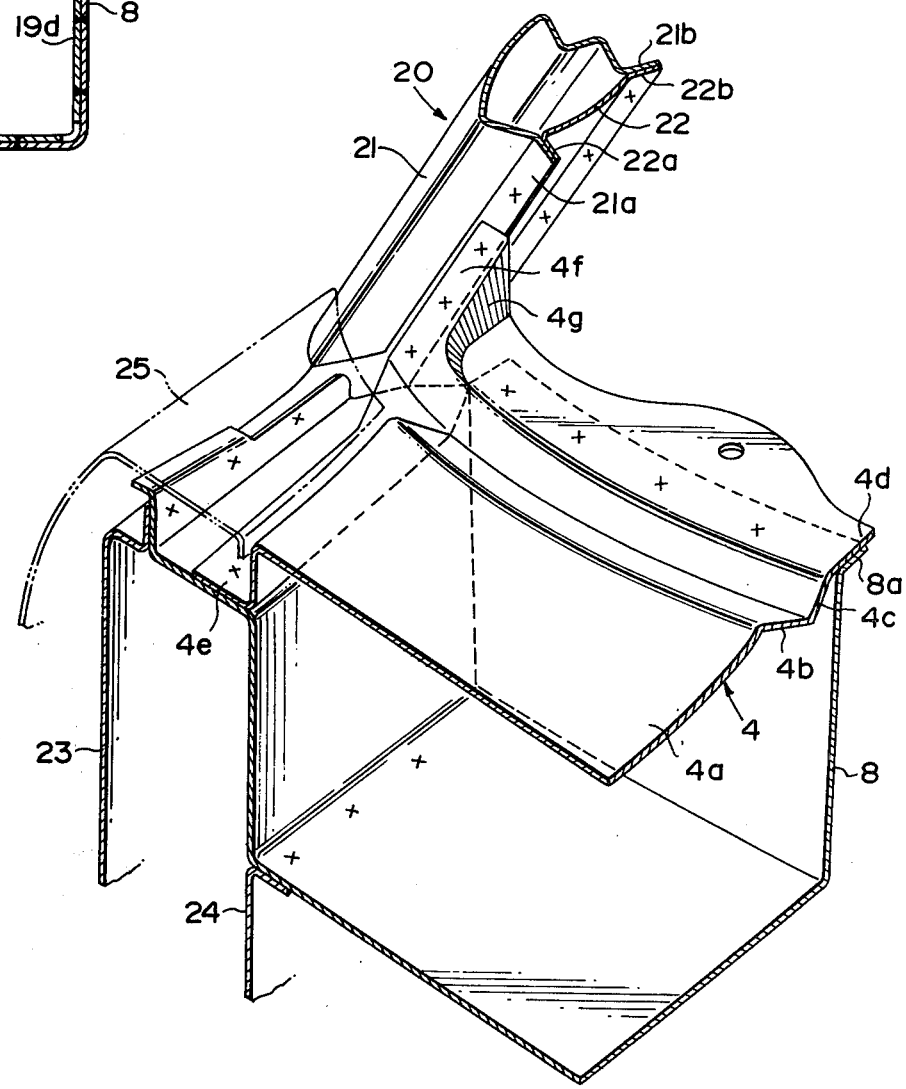

VEHICLE BODY STRUCTURE HAVING A WINDSHIELD AND COWL PANEL ASSEMBLY

The present invention relates to vehicle body structures and more particularly to cowl panel assemblies therefor.

Conventionally, automobile bodies generally include a so-called cowl panel assembly which extends between a front bonnet and a windshield glass. In a typical known construction, the cowl panel assembly has a panel portion adapted to be exposed outside to provide a continuous contour together with the bonnet and front fender of the body. The cowl panel assembly is also provided with window glass support portion which extends behind the windshield glass and to which the lower end of the glass is attached by means of an adhesive. The support portion is also utilized to attach the upper end portion of a dashboard panel. The glass support portion may be formed integrally with the cowl panel portion by forming a stepped intermediate portion therebetween, or separately formed and thereafter secured to the panel portion by suitable fastening means. At the outer side, the gap between the cowl panel portion of the cowl panel assembly and the windshield glass is covered by a moulding strip which is also secured to the panel portion by suitable means.

In this type of cowl panel assembly, the windshield glass support portion has a curvature which conforms to the curvature of the windshield glass, so that the dashboard panel has also to be curved at its upper end so as to be attached to the support portion. The conventional arrangement has therefore been found disadvantageous in that time and labour are required in correctly locating the dashboard panel with respect to the cowl panel assembly. Further, since traces of weldings are produced on the windshield support portion at the area where the windshield glass is adhesively attached, the sealing property at this area is adversely affected.

It is therefore an object of the present invention to provide automobile bodies having dashboard panels which are attached to cowl panel assemblies through flat planar parts.

Another object of the present invention is to provide cowl panel assemblies which are substantially free from welding traces at the areas where windshield glasses are adhesively attached thereto.

According to the present invention, the above and other objects can be accomplished by a vehicle body structure comprising a pair of transversely spaced front pillars, a transversely extending cowl panel assembly defining a windshield opening with said front pillars, a windshield glass disposed in said windshield opening, said cowl panel assembly including a cowl panel portion disposed forwardly of the windshield glass and a glass support portion having a glass support surface transversely extending substantially along a lower edge portion of the windshield glass, means for adhesively attaching the lower edge portion of the windshield glass to said glass support surface of the glass support portion, said glass support portion having a substantially planar extension extending rearwardly therefrom, a dashboard panel assembly having a rearwardly extending planar upper flange portion attached to said planar extension of the cowl panel assembly. The windshield glass support portion may be formed integrally with the cowl panel portion or separately formed and thereafter attached thereto.

The vehicle body usually has an instrument panel and in such case the instrument panel may be attached to the planar extension of the glass support portion or the upper flange portion of the dashboard panel. The cowl panel assembly is secured at its each end to the corresponding one of the front pillars. For the purpose, the windshield glass support portion is provided at each end with a gusset portion having a portion which smoothly continues to said glass support surface of the glass support portion and is adapted to be connected with the corresponding pillar. The gusset portion is connected through an oblique portion with said rearward planar extension of the glass support portion.

The above and other objects and features of the present invention will become apparent from the following descriptions of preferred embodiments taking reference to the accompanying drawings, in which:

FIG. 7 is a fragmentary sectional view showing the end portion of the cowl panel assembly in accordance with a further embodiment of the present invention;

FIG. 8 is a sectional view taken substantially along the line VIII—VIII in FIG. 7;

FIG. 9 is a sectional view taken substantially along the line IX—IX in FIG. 7;

FIG. 10 is a sectional view taken substantially along the line X—X in FIG. 7;

FIG. 11 is a sectional view taken substantially along the line XI—XI in FIG. 7; and FIG. 12 is a perspective view similar to FIG. 7 but showing a further embodiment of the present invention.

Figure 1:
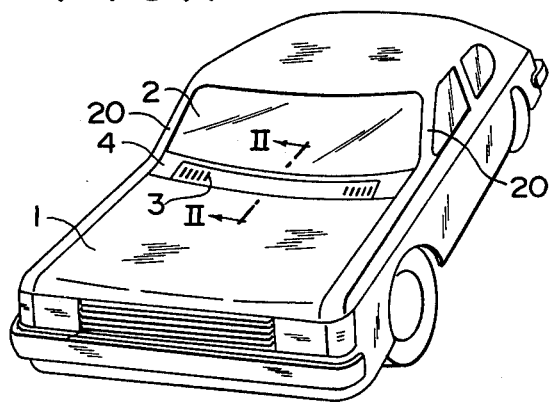
FIG. 1 is a perspective view of an automobile to which the present invention can be applied.
Figure 2:
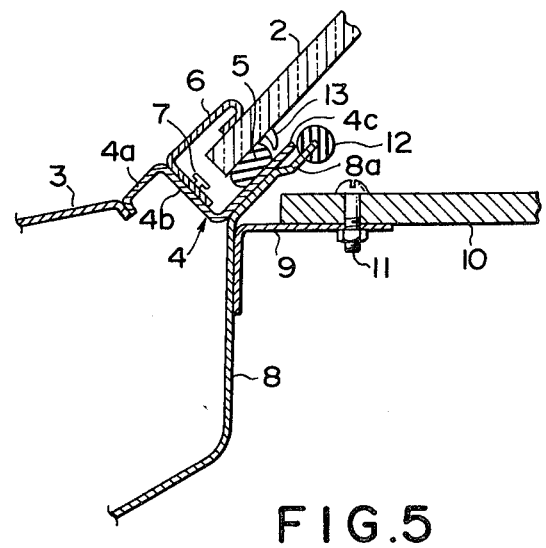
FIG. 2 is a sectional view taken substantially along the line II—II in FIG. 1 but showing a typical example of prior art.

Referring now to the drawings, particularly to FIG. 1, the automobile shown therein includes a car body B having a front bonnet 1 and a front windshield glass 2. A cowl panel assembly 4 is disposed between the bonnet 1 and the front windshield glass 2, and has air-venting cowl grills 3. Referring to FIG. 2, the conventional cowl panel assembly 4 shown therein includes a cowl panel portion 4a, an intermediate portion 4b and a windshield glass support portion 4c. The cowl panel portion 4a has an opening to which the aforementioned cowl grill 3 is attached. The glass support portion 4c extends behind the glass 2 substantially along the lower edge thereof and the glass 2 is attached to the portion 4c through a resilient adhesive 5. The intermediate portion 4b is substantially perpendicular to the plane of the glass 2 and extends along the lower edge thereof. A moulding strip 6 is attached to the intermediate portion 4b by means of studs 7 or the like to cover the gap between the glass 2 and the intermediate portion 4b of the cowl panel.

The dashboard panel 8 has an upper end 8a which extends along the glass support portion 4c and secured thereto by means of spot welding. An angle bracket 9 is welded to the panel 8 and support the front end of the instrument panel 10 which is secured to the bracket 9 by means of bolts 11. An edge rubber 12 is attached to the upper edge of the dashboard panel 8. The reference numeral 13 designates a dam which is provided at the lower end portion of the glass 2.

In this type of structure, inconveniencies have been experienced in that the glass support portion 4c is curved so as to conform to the curvature of the windshield glass 2 and therefore the upper end portion of the dashboard panel 8 must be correspondingly curved. Thus, the panel 8 must be precisely located for welding to the glass support portion 4c of the cowl panel assembly. Further, since the glass support portion 4c is welded to the panel 8 at the areas where the portion 4c is adhesively attached to the glass 2, the welding traces may have an adverse effect on the sealing property. In this type of structure, further disadvantages have been experienced in that, where drain holes are provided at the junction between the intermediate and the glass support portions 4b and 4c of the cowl panel assembly 4, the drain water from such drain holes may enter the mating surface between the glass support portion 4c and the panel 8 under capillary action and cause corrosion of the panel material. The structure is also disadvantageous because it requires additional parts such as the bracket 9.

Figure 3:
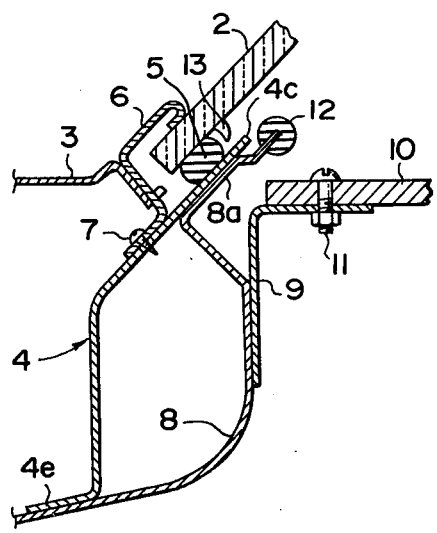
FIG. 3 is a sectional view similar to FIG. 2 but showing another example of prior art.

FIG. 3 shows another example of prior art in which the cowl panel assembly includes a cowl panel 4 having a windshield glass support portion 4c and a flanged lower end portion 4e. Th windshield glass 2 is attached to the portion 4c by means of an adhesive 5. A moulding strip 6 is secured to the intermediate part of the cowl panel 4d and supports a cowl panel portion of a cowl grill 3. The dashboard panel 8 has an upper end portion 8a which is welded to the glass support portion 4c of the cowl panel 4. As in the previously described stucture, the front end of the instrument panel 10 is supported through an angle bracket 9 by the dashboard panel 8. For the purpose, the panel 10 is secured by means of bolts 11 to the bracket 9 which is in turn welded to the panel 8. It will be understood that this type of structure also has disadvantages as discussed above.

Figure 4:
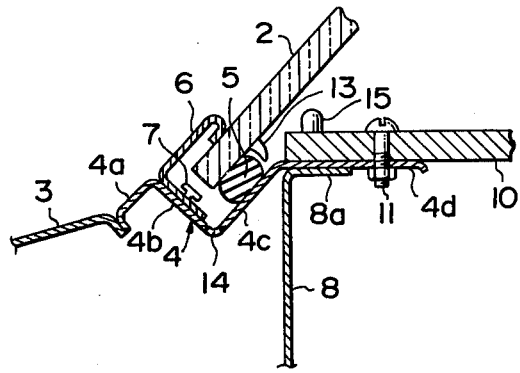
FIG. 4 is a sectional view showing the cowl panel assembly in accordance with one embodiment of the present invention.

Referring now to FIG. 4 which shows an embodiment of the present invention, the cowl panel assembly includes a cowl panel 4 which has a cowl panel portion 4a, an intermediate portion 4b and a windshield glass support portion 4c as in the structure shown in FIG. 2. A cowl grill 3 is attached to the cowl panel portion 4a in a manner commonly employed in the art. The glass support portion 4c extends behind the windshield glass 2 substantially along the lower end portion thereof and the glass 2 is attached to the portion 4c through an adhesive 5. The intermediate portion 4b is substantially perpendicular to the plane of the glass 2 and a moulding strip 6 is attached to the intermediate portion 4b by means of studs 7 so as to cover the gap between the lower end portion of the windshield glass 2 and the intermediate portion 4b of the cowl panel assembly.

In accordance with the feature of the present invention, the cowl panel 4 has a planar extension 4d which extends rearwardly from the windshield glass support portion 4c. The dashboard panel 8 has a planar flange 8a at the upper end thereof and is secured to the planar extension 4d of the cowl panel 4 by means of spot welding. The front end of the instrument panel 10 is secured by means of bolts 11 to the planar extension 4d of the cowl panel. The instrument panel 10 may be provided at its front end portion with a transversely extending ridge 15 for the purpose of concealing the adhesive 5 and the dam 13. The panel 4 may be formed with one or more drain holes 14 at the junction between the intermediate and support portions 4b and 4c.

In this arrangement, it will be understood that the dashboard panel 8 should not necessarily be precisely located in assembling operation because it is attached to the cowl panel 4 at the planar rearward extension 4d thereof. The instrument panel 10 can be attached directly to the cowl panel 4 without adopting any additional part such as an angle bracket. Further, drain holes can be formed in the cowl panel 4 without causing any corrosion problem. It should further be noted that the glass support portion 4c is free from welding traces so that an adequate seal can be provided in this area.

Figure 5:
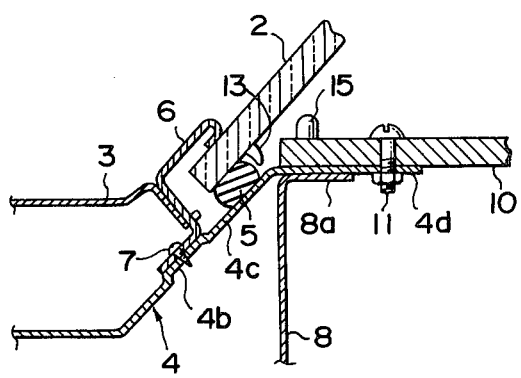
FIG. 5 is a sectional view showing another embodiment of the present invention.

Referring to FIG. 5 which shows another embodiment of the present invention, the structure includes a cowl panel 4 which has a windshield glass support portion 4c to which the windshield glass 2 is attached through an adhesive 5. A moulding strip 6 is attached to the cowl panel 4 by means of screws 7. For the purpose, the cowl panel 4 may be formed with a raised portion 4b and the strip 6 may be attached to this portion 4b. A cowl panel portion or a cowl grill 3 is attached to the moulding strip 6 as in the arrangement shown in FIG. 3. In the illustrated embodiment of the present invention, the cowl panel 4 has a planar rearward extension 4d to which the dashboard panel 8 is secured at its upper end flange 8a by means of spot welding. The instrument panel 10 is secured to the extension 4d by means of bolts 11.

Figure 6:
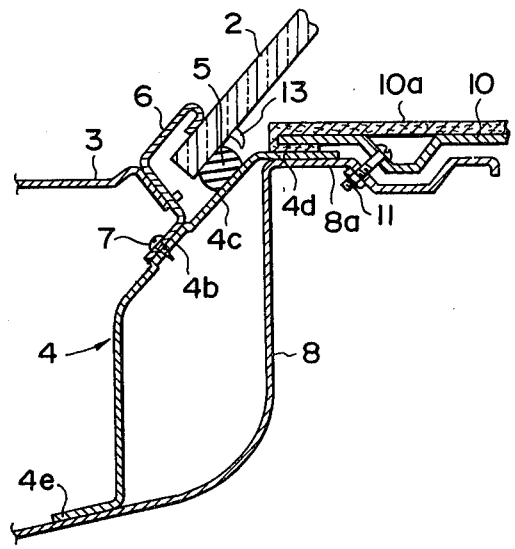
FIG. 6 is a sectional view similar to FIGS. 4 and 5 but showing a further embodiment of the present invention.

The embodiment shown in FIG. 6 is substantially similar to the embodiment shown in FIG. 5. Thus, the cowl panel 4 has a planar rearward extension 4d to which the dashboard panel 8 is attached at its upper end flange 8a by means of spot welding. The instrument panel 10 is covered by a leather sheet 10a and secured by means of bolts 11 to the flange 8a of the dashboard panel 8.

Referring now to FIGS. 7 through 11 which show an end portion of the cowl panel assembly, the cowl panel 4 includes a cowl panel portion 4a, an intermediate portion 4b, a windshield glass support portion 4c and a planar rearward extension 4d as in the embodiment shown in FIG. 4. The dashboard panel 8 has a planer upper flange 8a which is welded to the rearward extension 4d of the cowl panel 4. At each end, the dashboard panel 8 has a rounded corner relief portion 8b and, as shown in FIG. 10, a sloped portion 8c is formed at the upper end of the corner relief portion 8b. The sloped portion 8c extends along the glass support portion 4c of the cowl panel 4 and attached to the portion by means of spot welding S.

The car body has front pillars 29 at the both sides of the windshield glass 2 as shown in FIG. 1. Each of the pillars 20 is constructed as shown in FIGS. 7 and 8 and comprises an outer member 21 and an inner member 22 which are welded together by means of spot welding S at their flanges 21a, 22a and 21b, 22b.

The end of the dashboard panel 8 is connected with the front pillar 20 through an end panel 19 which is welded on one hand to the adjacent end of the dashboard panel 8 and on the other hand to the flange 21a of the front pillar 20. For the purpose, the dashboard panel 8 is joggled as shown by 8d in FIG. 9 and the end panel 19 has a planar portion 19a which is put on the joggled portion 8d and welded thereto together with the extension 4d of the cowl panel 4 which is superimposed on the planar portion of the end panel 19.

The end panel 19 has a flange 19b which is adapted to lie along the flange 21a of the front pillar 20 and secured thereto by spot welding. The flange 19b is connected with the planar portion 19a through a sloped panel portion 19c. The end panel 19 further has an end flange 19d which extends along and welded to the adjacent edge portion of the dashboard panel 8. The cowl panel 4 also has an end flange 4e which is welded to the end panel 19. The end panel 19 is further welded to a front hinge pillar 23, and a side panel 24 is welded to the dashboard panel 8 and the end panel 19 to form a rigid body structure. The reference numeral 25 designates a front fender.

Referring to FIG. 12, the cowl panel 4 has a flange portion 4f which is coextensive with the glass support portion 4c and lie along the flange 21a of the front pillar 20 as the flange 19b of the end panel 19 of the previous embodiment does. Thus, the cowl panel 4 is welded at the flange 4f to the flange 21a of the front pillar 20. The flange 4f of the cowl panel 4 is connected with the rearward extension 4d through a sloped portion 4g. In other respects, the arrangements in this embodiments are substantially the same as those in the previous embodiment so that corresponding parts are designated by the same reference numerals as in the previous embodiments. It should of course be noted that the end connecting structures shown in FIGS. 7 through 11 and in FIG. 12 can be applied also to the cowl panel assembly of such type shown in FIGS. 5 and 6.

The invention has thus been shown and described with reference to specific embodiments, however, it should be noted that the invention is in no way limited to the details of the illustrated structures but changes and modifications may be made without departing from the scope of the appended claims.

I claim:

1. Vehicle body structure comprising a pair of transversely spaced front pillars, a transversely extending cowl panel assembly defining a windshield opening with said front pillars, a curved windshield glass disposed in said windshield opening, said cowl panel assembly including a cowl panel portion disposed forwardly of the windshield glass and a glass support portion having a glass support surface transversely extending substantially along a lower edge portion of an inner surface of the curved windshield glass, said glass support portion being connected with said cowl panel portion at a lower portion of said glass support surface, means for adhesively attaching the lower edge portion of the curved windshield glass to said glass support surface of the glass support portion, said glass support portion having a substantially planar extension extending rearwardly from an upper end portion of the glass support surface, a dashboard panel assembly having a vertical panel portion disposed downwardly of the curved windshield glass and a planar upper flange portion attached to said planar extension of the cowl panel assembly.

2. Vehicle body in accordance with claim 1 in which said cowl panel portion is formed integrally with said windshield glass support portion, an intermediate portion being formed between said cowl panel portion and said glass support portion so as to extend substantially perpendicularly to the windshield glass, moulding strip means being attached to said intermediate portion to cover a gap between the intermediate portion and the windshield glass.

3. Vehicle body in accordance with claim 1 in which said cowl panel portion is connected with said glass support portion through moulding strip means which extends to cover a gap between the cowl panel portion and the windshield glass.

4. Vehicle body structure in accordance with claim 1 in which each of the front pillars includes a flange to which said windshield glass is adhesively attached, said cowl panel assembly being provided at each transverse end with a flange which is coextensive with said glass support portion and adapted to lie on said flange on the front pillar to be connected therewith and a sloped connecting portion extending between said flange on the cowl panel assembly and said rearward planar extension.

5. Vehicle body structure in accordance with claim 4 in which said flange and said sloped connecting portion on the cowl panel assembly are integral with said glass support portion.

6. Vehicle body structure in accordance with claim 4 in which said flange and said sloped connecting portion of the cowl panel assembly are formed separately from and welded to the glass support portion.

7. Vehicle body structure in accordance with claim 1 in which each of said front pillars includes a flange to which said windshield glass is adhesively attached, said vehicle body structure further including an end panel at each transverse end of the dashboard panel, said end panel having a flange adapted to lie on and be connected with said flange on the front pillar and an edge portion adapted to be connected with the adjacent end of the dashboard panel, said end panel having a sloped connecting portion extending between said flange and the edge portion.

8. Vehicle body structure in accordance with claim 3 in which said glass support portion has a downwardly extending wall which is formed with a lower end flange, said dashboard panel being formed with a forwardly extending portion which is connected with said lower end flange on the glass support portion.

9. Vehicle body structure in accordance with claim 1 which further include an instrument panel having a front end secured to said rearward extension of the glass support portion.

10. Vehicle body structure in accordance with claim 1 which further include an instrument panel having a front end secured to the upper flange portion of the dashboard panel.

11. Vehicle body structure comprising a pair of transversely spaced front pillars, a transversely extending cowl panel assembly defining a windshield opening with said front pillars, a curved windshield glass disposed in said windshield opening, said cowl panel assembly including a cowl panel portion disposed forwardly of the windshield glass and a glass support portion having a rearwardly inclined glass support surface along a lower edge portion of an interior surface of the windshield glass and connected to said cowl panel portion at a lower portion of the glass support surface, means for adhesively attaching the lower edge portion of the windshield glass to said glass support surface of the glass support portion, said glass support portion having an extension rearwardly extending from an upper end portion of the glass support surface, a dashboard panel assembly having a vertical panel portion disposed downwardly of the windshield glass and an upper flange portion rearwardly extending from the upper end portion of the vertical panel portion and attached to said extension of the glass support portion.

12. Vehicle body in accordance with claim 11 in which said extension of the glass support portion and said upper flange portion of said dashboard panel assembly extend horizontally.

* * * * *